(12) United States Patent
Ricca et al.

(10) Patent No.: US 10,532,824 B2
(45) Date of Patent: *Jan. 14, 2020

(54) OBSTRUCTION LIGHTING SYSTEM CONFIGURED TO EMIT VISIBLE AND INFRARED LIGHT

(71) Applicant: Hughey & Phillips, LLC, Urbana, OH (US)

(72) Inventors: Steven V. Ricca, Upper Arlington, OH (US); Lon E. Rhoades, Springfield, OH (US); Jeffrey A. Jacobs, Galloway, OH (US); Richard C. Mula, Westlake Village, CA (US); Brian J. Hockensmith, Columbus, OH (US); Michael A. Forhan, Urbana, OH (US)

(73) Assignee: Hughey & Phillips, LLC, Urbana, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,460

(22) Filed: Oct. 22, 2018

(65) Prior Publication Data

US 2019/0055034 A1    Feb. 21, 2019

Related U.S. Application Data

(63) Continuation of application No. 15/099,668, filed on Apr. 15, 2016, now Pat. No. 10,106,276.

(Continued)

(51) Int. Cl.
*B64D 45/08* (2006.01)
*B64F 1/20* (2006.01)
(Continued)

(52) U.S. Cl.
CPC ............... *B64D 45/08* (2013.01); *B64F 1/20* (2013.01); *F21S 2/00* (2013.01); *F21V 23/009* (2013.01);
(Continued)

(58) Field of Classification Search
CPC . B64D 45/08; F21W 2111/06; F21Y 2115/10; B64F 1/20
(Continued)

(56) References Cited

U.S. PATENT DOCUMENTS 3,610,912 A    10/1971  Schwartz
4,498,004 A     2/1985  Adolfsson et al.
(Continued)

FOREIGN PATENT DOCUMENTS

CN       201636748 U   11/2010
EP         1231109 A1   8/2002
(Continued)

OTHER PUBLICATIONS

Dialight, PLC, Brochure, "Vigilent(R) LED Based Obstruction Lights," PDF Creation Date Feb. 29, 2016, 12 pages, Document No. Obstruction_Brochure_M, retrieved from company website www.dialight.com May 10, 2016.
(Continued)

*Primary Examiner* — Robert J May
(74) *Attorney, Agent, or Firm* — Lorraine Hernandez; Kegler Brown Hill + Ritter, LLP, Co.

(57) ABSTRACT

A lighting system includes a first light assembly that is configured to emit light periodically. The lighting system further includes a second light assembly that is spaced apart from the first light assembly, the second light assembly also being configured to emit light periodically. The periodic light emitted by the first and second light assemblies is synchronized such that the first and second light assemblies operate in unison to form a single light source.

15 Claims, 8 Drawing Sheets

Related U.S. Application Data

(60) Provisional application No. 62/148,584, filed on Apr. 16, 2015.

(51) Int. Cl.

| | | |
|---|---|---|
| *F21S 2/00* | (2016.01) | |
| *H05B 33/08* | (2006.01) | |
| *F21V 23/00* | (2015.01) | |
| *F21V 7/22* | (2018.01) | |
| *F21V 29/70* | (2015.01) | |
| *F21V 29/89* | (2015.01) | |
| *F21V 23/04* | (2006.01) | |
| *F21W 111/06* | (2006.01) | |
| *F21Y 115/10* | (2016.01) | |

(52) U.S. Cl.
CPC ............ *H05B 33/0803* (2013.01); *F21V 7/22* (2013.01); *F21V 23/003* (2013.01); *F21V 23/0407* (2013.01); *F21V 29/70* (2015.01); *F21V 29/89* (2015.01); *F21W 2111/06* (2013.01); *F21Y 2115/10* (2016.08)

(58) Field of Classification Search
USPC ..................................................... 362/249.02
See application file for complete search history.

(56) References Cited

U.S. PATENT DOCUMENTS

| | | | |
|---|---|---|---|
| 4,609,306 | A | 9/1986 | Loire |
| 5,155,666 | A | 10/1992 | Radford et al. |
| 5,608,290 | A | 3/1997 | Hutchisson et al. |
| 5,642,933 | A | 7/1997 | Hitora |
| 5,838,247 | A | 11/1998 | Bladowski |
| 5,929,788 | A | 7/1999 | Vukosic |
| 6,022,124 | A | 2/2000 | Bourn et al. |
| 6,070,994 | A | 6/2000 | Sebek et al. |
| 6,183,100 | B1 | 2/2001 | Suckow et al. |
| 6,364,506 | B1 | 4/2002 | Gallo |
| 6,379,026 | B1 | 4/2002 | Petrick |
| 6,425,678 | B1 | 7/2002 | Verdes et al. |
| 6,464,373 | B1 | 10/2002 | Petrick |
| 6,525,668 | B1 | 2/2003 | Petrick |
| 6,561,689 | B1 | 5/2003 | Kidd et al. |
| 6,601,970 | B2 | 8/2003 | Ueda et al. |
| 6,637,921 | B2 | 10/2003 | Coushaine |
| 6,679,618 | B1 | 1/2004 | Suckow et al. |
| 6,705,745 | B1 | 3/2004 | Pederson |
| 6,793,372 | B2 | 9/2004 | Wehner et al. |
| 6,932,496 | B2 | 8/2005 | Rizkin et al. |
| 6,948,830 | B1 | 9/2005 | Petrick |
| 6,962,423 | B2 | 11/2005 | Hamilton et al. |
| 6,991,351 | B1 | 1/2006 | Petrick |
| 7,040,782 | B2 | 5/2006 | Mayer |
| 7,079,041 | B2 | 7/2006 | Fredericks et al. |
| 7,160,004 | B2 | 1/2007 | Peck |
| 7,163,322 | B2 | 1/2007 | Tatewaki et al. |
| 7,236,105 | B2 | 6/2007 | Brenner et al. |
| 7,237,929 | B2 | 7/2007 | Stahl |
| 7,378,983 | B2 | 5/2008 | Wang |
| 7,497,593 | B2 | 3/2009 | Wang |
| 7,568,821 | B2 | 8/2009 | Peck et al. |
| 7,578,600 | B2 | 8/2009 | Czajkowski |
| 7,604,384 | B2 | 10/2009 | Peck |
| 7,658,513 | B2 | 2/2010 | Peck |
| 7,758,210 | B2 | 7/2010 | Peck |
| 7,791,497 | B2 | 9/2010 | Clerk |
| 7,832,908 | B2 | 11/2010 | Peck et al. |
| 8,033,683 | B2 | 10/2011 | Fields |
| 8,096,677 | B2 | 1/2012 | Fields et al. |
| 9,010,969 | B2 | 4/2015 | Roudeski et al. |
| 9,013,331 | B2 | 4/2015 | Wise |
| 9,016,896 | B1 | 4/2015 | Roudeski |
| 9,206,961 | B1 | 12/2015 | Bastiani et al. |
| 9,297,514 | B2 | 3/2016 | Roudeski |
| 9,423,086 | B2 | 8/2016 | Peck |
| 9,572,223 | B1 | 2/2017 | Mula et al. |
| 9,694,914 | B2 | 7/2017 | Wise |
| 9,702,525 | B1 | 7/2017 | Roudeski |
| 10,124,910 | B2 | 11/2018 | Wise |
| 2001/0015899 | A1 | 8/2001 | Kondo et al. |
| 2004/0004836 | A1 | 1/2004 | Dubuc |
| 2004/0057234 | A1 | 3/2004 | Mohacsi |
| 2004/0057244 | A1 | 3/2004 | Amano |
| 2004/0145910 | A1 | 7/2004 | Lisowski |
| 2004/0196646 | A1 | 10/2004 | Machi et al. |
| 2005/0094393 | A1 | 5/2005 | Czajkowski |
| 2005/0157490 | A1 | 7/2005 | Klose |
| 2006/0007012 | A1 | 1/2006 | Machi et al. |
| 2006/0012990 | A1 | 1/2006 | Walser et al. |
| 2006/0083017 | A1 | 4/2006 | Wang |
| 2006/0291209 | A1 | 12/2006 | Booth et al. |
| 2008/0192480 | A1 | 8/2008 | Rizkin et al. |
| 2009/0207605 | A1 | 8/2009 | Fields |
| 2009/0219715 | A1 | 9/2009 | Peck et al. |
| 2010/0027281 | A1 | 2/2010 | Waters et al. |
| 2010/0049454 | A1 | 2/2010 | Irissou et al. |
| 2010/0084979 | A1 | 4/2010 | Burton et al. |
| 2010/0194603 | A1 | 8/2010 | Wobben |
| 2010/0244748 | A1 | 9/2010 | Haab et al. |
| 2010/0259929 | A1 | 10/2010 | Henri et al. |
| 2011/0018439 | A1 | 1/2011 | Fabbri et al. |
| 2011/0051421 | A1 | 3/2011 | Chew |
| 2011/0058370 | A1 | 3/2011 | Datz et al. |
| 2011/0090681 | A1 | 4/2011 | Hobson |
| 2011/0121734 | A1 | 5/2011 | Pape |
| 2011/0194283 | A1 | 8/2011 | Roer |
| 2011/0235322 | A1 | 9/2011 | Fields et al. |
| 2011/0241926 | A1 | 10/2011 | Laufer |
| 2011/0301567 | A1 | 12/2011 | Boulanger |
| 2011/0305014 | A1 | 12/2011 | Peck |
| 2012/0300449 | A1 | 11/2012 | Fields |
| 2014/0062302 | A1 | 3/2014 | Tischler |
| 2016/0201888 | A1 | 7/2016 | Ackley et al. |
| 2016/0304215 | A1 | 10/2016 | Ricca et al. |
| 2019/0168890 | A1 | 6/2019 | Wise |

FOREIGN PATENT DOCUMENTS

| | | | |
|---|---|---|---|
| EP | 1698823 | A2 | 9/2006 |
| EP | 1698823 | B1 | 4/2010 |
| EP | 2199206 | A1 | 6/2010 |
| EP | 2648174 | A3 | 10/2013 |
| JP | 2001243821 | A | 9/2001 |
| WO | 2009084049 | A1 | 7/2009 |
| WO | 2009090185 | A2 | 7/2009 |
| WO | 2009133326 | A2 | 11/2009 |

OTHER PUBLICATIONS

SPX Corporation, Brochure, "FTS 361X-5 Medium Intensity Red LED Aviation Obstruction Lighting System," PDF Creation Date Feb. 11, 2016, 2 pages, Document No. FTS361X-120115, retrieved from company website www.spx.com May 10, 2016.

"Vanguard(R) FTS 370d, 370w, 370r LED Medium Intensity Obstruction Lighting System," Reference Manual, Revision 18, Sep. 21, 2017, Part No. F7913702, 104 pages, published by Flash Technology, Franklin, Tennessee, retrieved from company website www.flashtechnology.com Dec. 7, 2017.

"LP-8862-Q1 Low-EMI Automotive LED Driver With Two 160-mA Channels," product data sheet, Aug. 2016, 10 pages, published by Texas Instruments, Dallas, Texas.

European Search Report, Application EP12160211, dated Aug. 7, 2013.

Dialight Corp., Product datasheet for D164 Series LED Red Beacon, 1 page, printed Jan. 21, 2011, Newmarket, England.

Promotional Sheet, Excelitas Technologies "Lighting Solutions for Safety and Security". 4 pages. Copyright 2011.

Data Sheet, Orga Model AOL 1000SA High Intensity Aeronautical Obstruction Light, 1 page, created 2007.

(56) References Cited

OTHER PUBLICATIONS

Installation and Operation Guide, "Horizon(TM) Medium Intensity Dual LED Lighting System," Manual No. EPM-00000043-001, Revision E, copyright 2014, 17 pages, Hughey & Phillips, LLC, Urbana Ohio, retrieved from company website www.hugheyandphillips.com Apr. 23, 2018.

Unpublished U.S. Appl. No. 15/386,587, filed by Jacobs et al. on Dec. 21, 2016. Application is in USPTO IFW and so a copy has not been provided, consistent with MPEP 609.

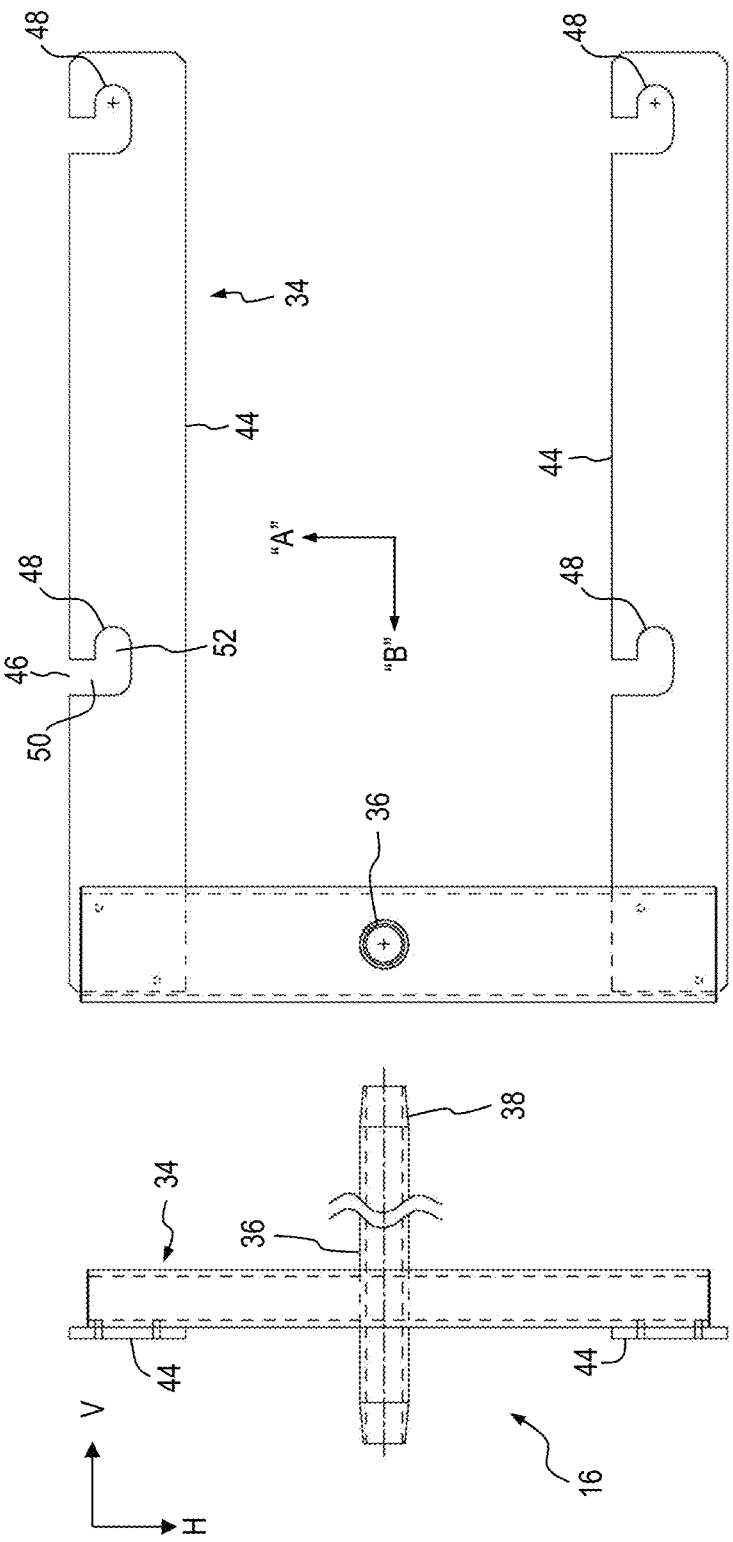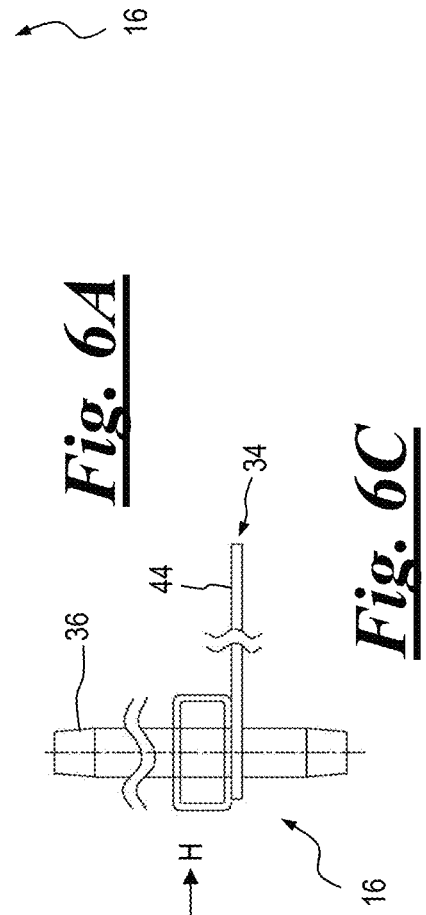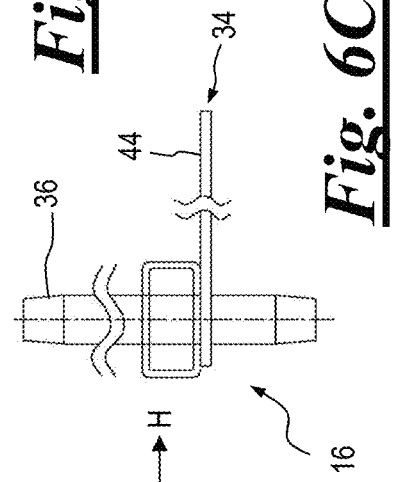
Fig. 6A
Fig. 6B
Fig. 6C

OBSTRUCTION LIGHTING SYSTEM CONFIGURED TO EMIT VISIBLE AND INFRARED LIGHT

CROSS-REFERENCE TO RELATED APPLICATIONS

This application is a continuation of U.S. patent application Ser. No. 15/099,668, filed Apr. 15, 2016, which claims priority to U.S. provisional patent application No. 62/148,584, filed Apr. 16, 2015, the entire contents of each of these applications being expressly incorporated by reference herein.

FIELD

The present disclosure relates generally to lighting systems, in particular to obstruction lighting systems.

BACKGROUND

The Federal Aviation Administration (FAA) requires that obstructions to aircraft navigation, such as towers, cables and tall buildings be fitted with visibly perceivable elements to render these structures highly visible to approaching aircraft. FAA Advisory Circular 150/5345-43 forms a specification of technical requirements for these lights in the United States. Within Advisory Circular 150/5345-43 there exists a requirement for a medium-intensity flashing red obstruction light system, designated the "L-864" and a medium-intensity flashing white obstruction light, designated the "L-865." These obstruction lights are to be placed in accordance with a set plan at levels on all obstructions that are potential hazards to air navigation.

For the L-864 obstruction light, at all radials throughout a 360 degree azimuth, there must be a peak effective intensity of 2,000±25 percent candela. There must also be a minimum effective intensity of 750 candela throughout a minimum vertical beam spread of 3 degrees. For the L-865 obstruction light, at all radials throughout a 360 degree azimuth, there must be a peak effective intensity of 20,000±25 percent candela during operation at day and twilight conditions, and 2,000±25 percent candela during night conditions. The L-865 obstruction light also includes a minimum vertical beam spread of 3 degrees.

While visible-light obstruction lighting performance standards are well established, there are no standards for compatibility of obstruction lights with night vision imaging systems ("NVIS") commonly used by military and emergency/rescue air operators. NVIS systems are typically configured to receive and amplify low-level infrared radiation to form a "night vision" image, which improves air operators' ability to navigate at night, especially in poor visibility conditions. The lack of performance standards for compatibility with NVIS systems is particularly problematic for obstruction lights that utilize light emitting diodes (LEDs), since LEDs generate considerably less heat (and thus less infrared radiation) than conventional incandescent and xenon strobe light sources, making them difficult to see with NVIS. Providers of obstruction lighting systems have attempted to solve this problem by adding some infrared light emitting diodes (IRLEDs) to their visible-light obstruction lighting systems. However, since these obstruction lighting systems are optimized to emit visible light they are often poor emitters of infrared light. There remains a need for an obstruction lighting system that provides satisfactory light emissions for both visible light and infrared light.

SUMMARY

An obstruction lighting system configured to emit visible and infrared light is disclosed. The system comprises a first light assembly that is configured to emit visible light. A second light assembly is configured to emit infrared light. A mounting bracket couples together the second light assembly and the first light assembly.

According to one embodiment, a lighting system includes a first light assembly that is configured to emit light periodically. The lighting system further includes a second light assembly that is spaced apart from the first light assembly, the second light assembly also being configured to emit light periodically. The periodic light emitted by the first and second light assemblies is synchronized such that the first and second light assemblies operate in unison to form a single light source.

In another embodiment a lighting system comprises a first light assembly that is configured to emit light periodically. A second light assembly is spaced apart from the first light assembly and is configured to emit light periodically. The lighting system further includes a mounting bracket having a first, generally planar member and a second, generally tubular member attached to the first member and oriented generally perpendicularly with respect to the first member. The second light assembly is coupled to the second member. The periodic light emitted by the first and second light assemblies is synchronized such that the first and second light assemblies operate in unison to form a single light source.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 6A, 6B and 6C show top plan, end elevational and side elevational views respectively of a mounting bracket of the system of FIG. 1;

DETAILED DESCRIPTION

Figure 1:
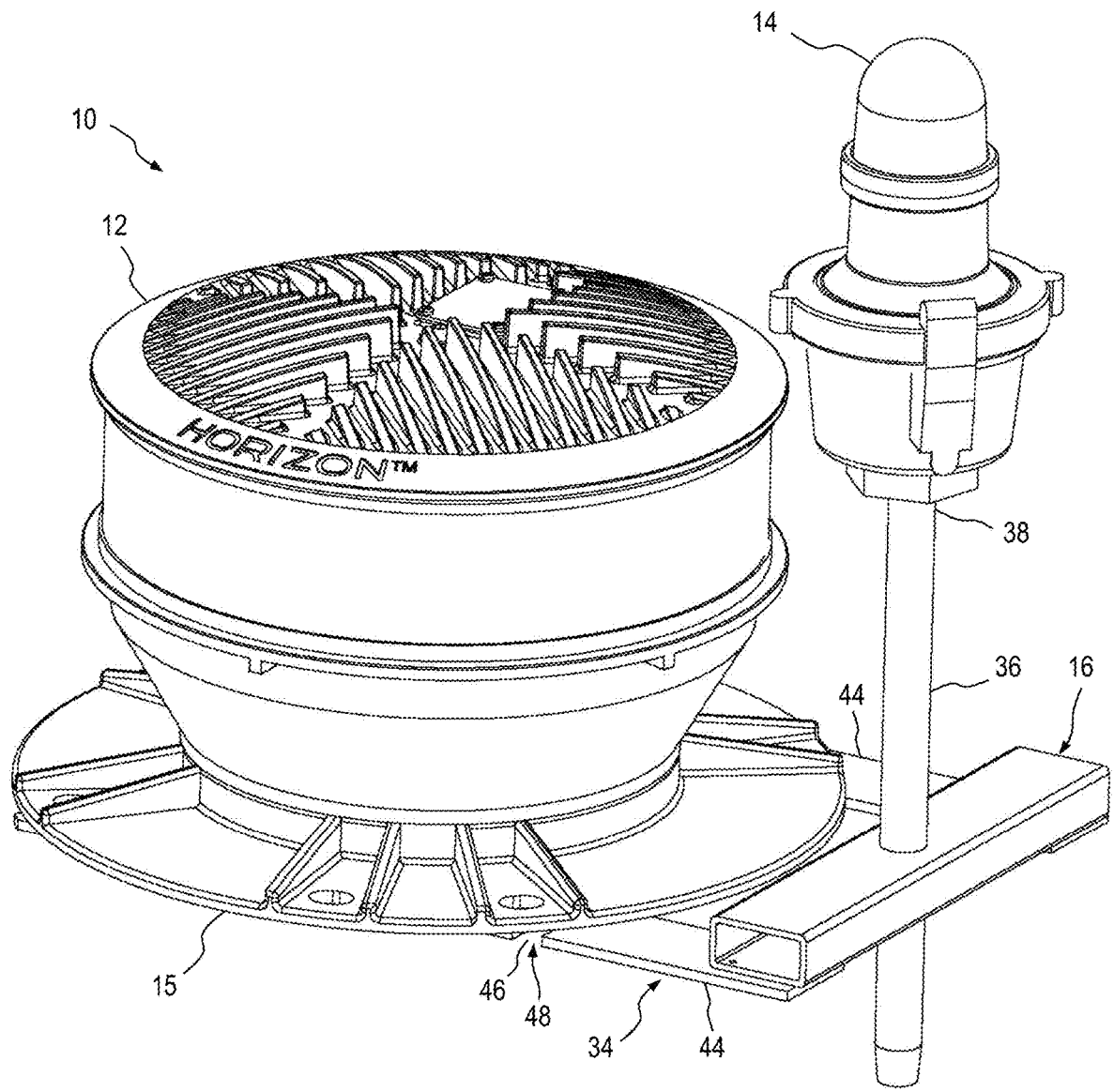
FIG. 1 shows the general arrangement of an obstruction lighting system configured to emit both visible and infrared light.

The general arrangement of an obstruction lighting system 10 configured to emit both visible and infrared light is shown in FIG. 1. System 10 comprises a first light assembly 12 that is configured to emit visible light. A second light assembly 14 is configured to emit infrared light.

A mounting bracket 16 couples second light assembly 14 to a mounting base 15 of first light assembly 12 and also provides a mounting point for the second light assembly that positions the second light assembly with respect to the first light assembly.

Figure 2:
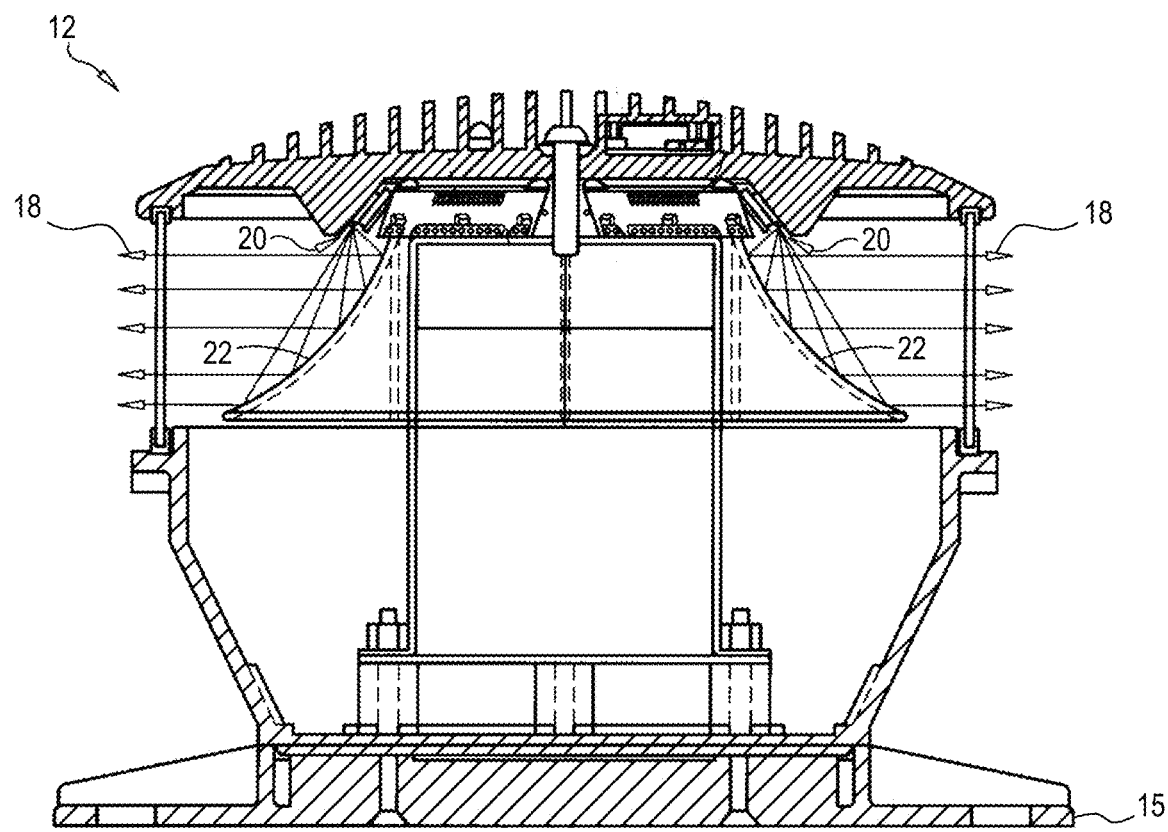
FIG. 2 shows the general arrangement of a visible light assembly.

Details of an example first light assembly 12 are shown in FIG. 2. Visible light 18 generated by a set of visible-light LEDs 20 is reflected by a reflector 22. The visible light 18 may be white or red in color, and may be steady-burning or may flash at a predetermined flashrate and ON-OFF duty cycle. First light assembly 12 may include at least some of the features of U.S. Pat. No. 9,010,969, which is commonly owned by the present applicant and is expressly incorporated by reference herein. First light assembly 12 may optionally be an FAA-type L-864. LEDs 20 may vary in number, type, size, shape, style, orientation, arrangement, and so on to suit a particular application. Likewise, the optical characteristics of first light assembly 12 may also be varied, such as with various types, sizes, shapes, styles, orientations, arrangements, and so on of reflectors and lenses to suit a particular application.

Figure 3:
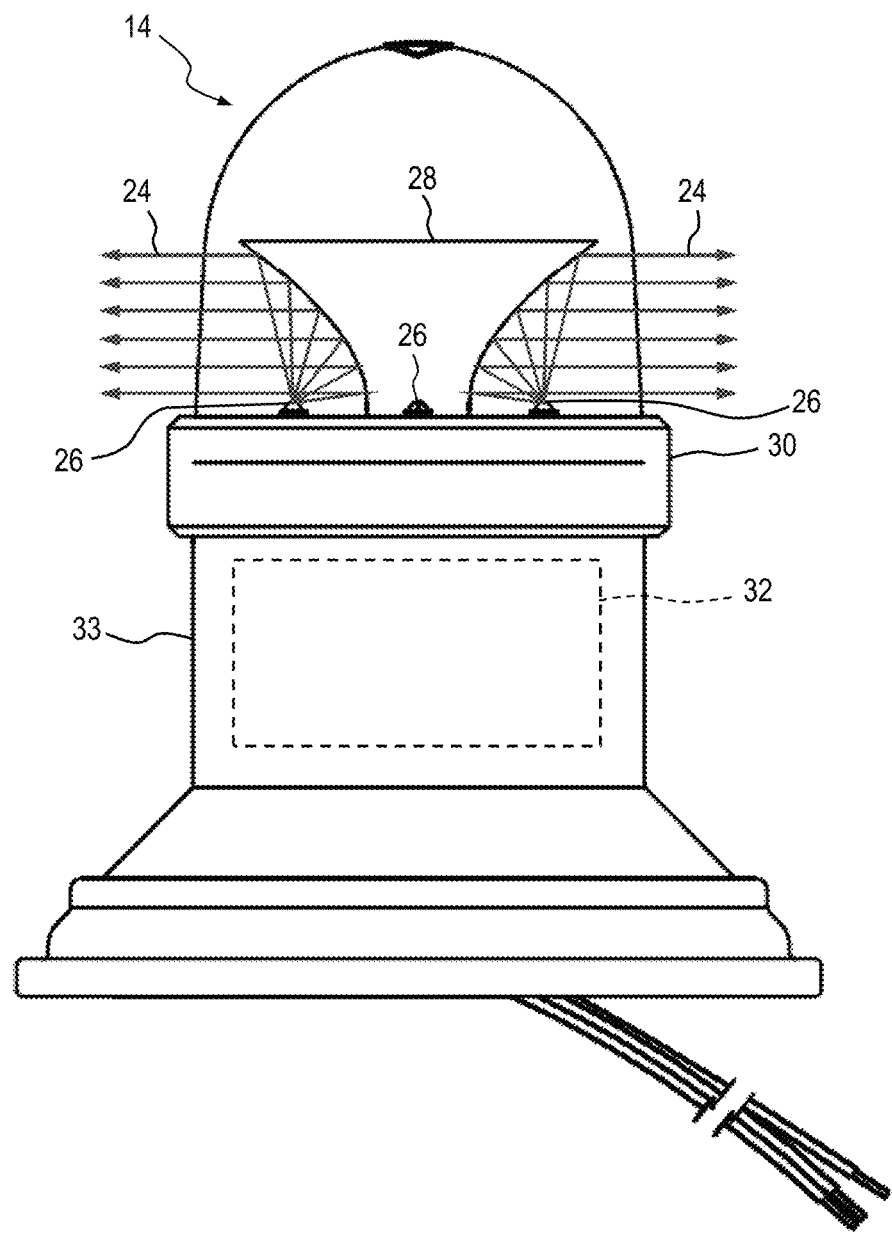
FIG. 3 shows the general arrangement of an infrared light assembly.
Figure 4:
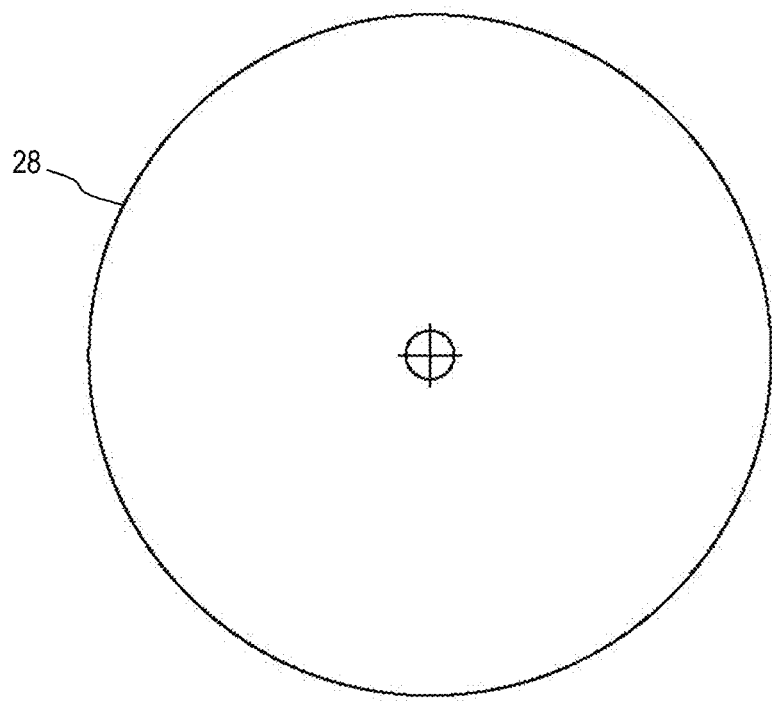
FIGS. 4 and 5 are top and side elevational views respectively showing details of a reflector of the infrared light assembly of FIG. 3.
Figure 5:
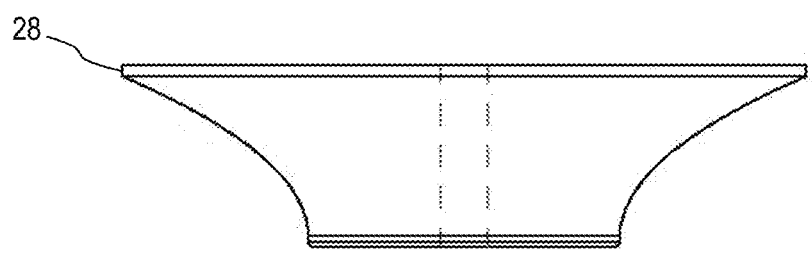
Figure 7:
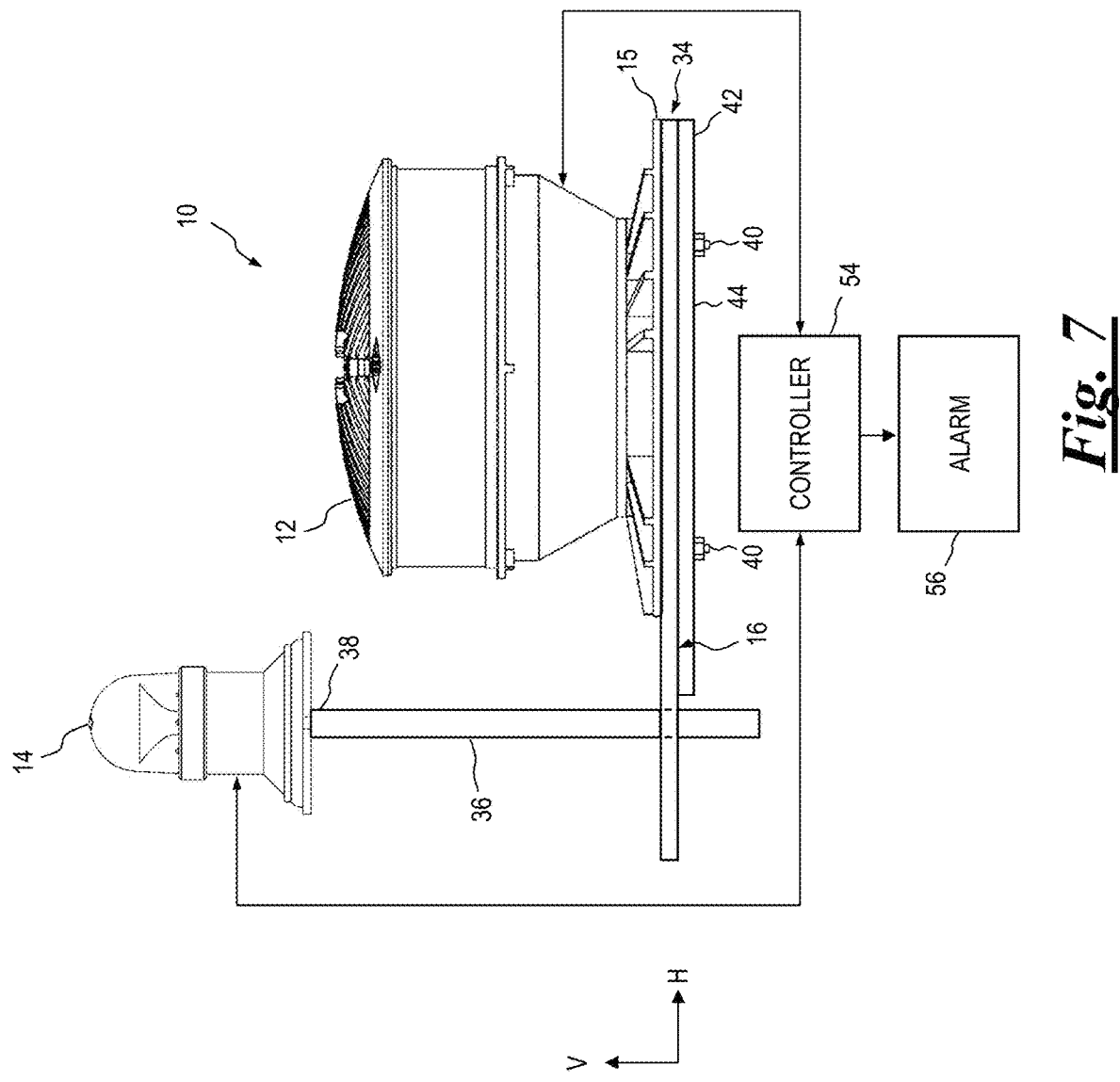
FIG. 7 shows a controller and an alarm coupled to the system of FIG. 1.

Details of an example second light assembly 14 are shown in FIG. 3. Second light assembly 14 may optionally be an FAA-type L-810. Infrared light 24 generated by a set of IRLEDs 26 is reflected by a reflector 28. Further details of reflector 28 are shown in FIGS. 4 and 5. In some embodiments one or more light-reflecting surfaces of reflector 28 may be coated with materials such as, but not limited to, gold. IRLEDs 26 may vary in number, type, size, shape, style, orientation, arrangement, and so on to suit a particular application. Likewise, the optical characteristics of second light assembly 14 may also be varied, such as with various quantities, types, sizes, shapes, styles, orientations, arrangements, and so on of reflectors and lenses to suit a particular application.

The infrared light 24 may be steady-burning or may flash at a predetermined flashrate and ON-OFF duty cycle. Second light assembly 14 may include at least some of the features of U.S. Pat. No. 9,016,896, which is commonly owned by the present applicant and is expressly incorporated by reference herein.

In some embodiments thermal management of IRLEDs 26 is applied such that heat is spread generally evenly to a supporting metal heat sink 30 that is in thermal communication with the IRLEDs. Preferably, driver electronics 32 for powering IRLEDs 26 are thermally isolated from the IRLEDs, such as being located under the IRLEDs within a housing 33 or remotely located so the driver electronics do not gain heat from the IRLEDs. A similar arrangement may be utilized for visible-light LEDs 20.

With reference to FIGS. 6A, 6B and 6C, mounting bracket 16 includes a generally U-shaped first portion 34, which is coupled to mounting base 15 of first lighting assembly 12. A second portion 36 is oriented generally perpendicularly with respect to first portion 34. Second lighting assembly 14 is attached to a distal end 38 of second portion 36. In one embodiment second portion 36 is made selectably adjustable with respect to first portion 34, to allow vertical adjustment of the position of second lighting assembly 14.

Mounting bracket 16 may be made from any suitable materials including, without limitation, steel, stainless steel, titanium, aluminum, composite and polymer materials and may be formed using any suitable processes including, without limitation, casting, machining, spinning, stamping, forming, molding and forging. Surfaces of the components of mounting bracket 16 may be prepared and treated in any suitable manner, or may be left unfinished. Non-limiting example treatments include any of painting, plastic coating, powder coating, hot-dip galvanizing, plating, dyes, polishing, and molded-in colors. In addition, at least some of the various components of mounting bracket 16 may be formed as an assembly of separate components and joined together, or may be made as a single unitary piece. The components of mounting bracket 16 may be heat treated and/or shot peened as appropriate for the materials selected for the components of the mounting bracket.

With reference again to FIG. 1 in combination with FIGS. 6A, 6B, 6C and 7, second light assembly 14 and mounting bracket 16 are preferably sized and shaped so that they adequately support the second light assembly while blocking only a minimal part of the visible light 18 emitted by first light assembly 12. Mounting bracket 16 and second lighting assembly 14 are also preferably relatively small in size to present minimal additional wind loading to an obstruction (e.g., a tower) to which system 10 is mounted.

Mounting bracket 16 is preferably configured such that it can be installed without complete removal of mounting hardware 40 (FIG. 7) used to selectably couple the mounting base 15 of first light assembly 12 to a support member 42 of an obstruction (not shown) to which system 10 is attached. To install mounting bracket 16, mounting hardware 40 is loosened sufficiently to allow one or more arms 44 (FIG. 6B) of first portion 34 to fit between mounting base 15 of first light assembly 12 and support member 42. An opening 46 of one or more generally L-shaped apertures 48 of each arm 44 is aligned with corresponding mounting hardware 40. Mounting bracket 16 is moved in a first direction "A" such that the mounting hardware 40 moves into a first aperture portion 50. Mounting bracket 16 is then moved in a second direction "B" such that the mounting hardware 40 moves into a second aperture portion 52. Mounting hardware 40 is then re-tightened, securing together mounting bracket 16, first light assembly 12 and support member 42. This process may be carried out in reverse to uninstall bracket 16.

Mounting bracket 16 is preferably further configured to allow electrical wiring (not shown) for second light assembly 14 to pass through second bracket portion 36 without obstructing the visible light output from first light assembly 12.

As previously noted, first light assembly 12 and/or second light assembly 14 may be configured to be steady-burning or to flash at one or more predetermined flashrate and/or duty cycles. In one embodiment first light assembly 12 and second light assembly 14 flash independently of one another. In another embodiment the flashing of first light assembly 12 and second light assembly 14 may be controlled by a controller 54, shown in FIG. 7. Controller 54 may be configured to flash first light assembly 12 and second light assembly 14 in a predetermined manner, such as synchronously together or alternately. Alternatively, controller 54 may be configured to synchronize flash control circuitry (not shown) disposed in first light assembly 12 and/or second light assembly 14. Controller 54 may be a separate component of system 10, or may be incorporated into either or both of first light assembly 12 and second light assembly 14, in whole or in part.

In some embodiments controller 54 may monitor first light assembly 12 and/or second light assembly 14 for faults including, but not limited to, failures of LEDs 20 and IRLEDs 26. Example failures include, without limitation, an open-circuit and a short-circuit condition in the light emitting diodes. Upon detection of faults controller 54 may activate one or more alarms 56, which may be local and/or remote to system 10, the alarm providing an alerting signal to alert service personnel of the faults.

Alarm 56 may be a separate component, or may be partially or fully combined with controller 54. Alternatively, alarm 56 may be partially or fully incorporated into either or both of first light assembly 12 and second light assembly 14, with or without portions or all of controller 54.

Figure 8:
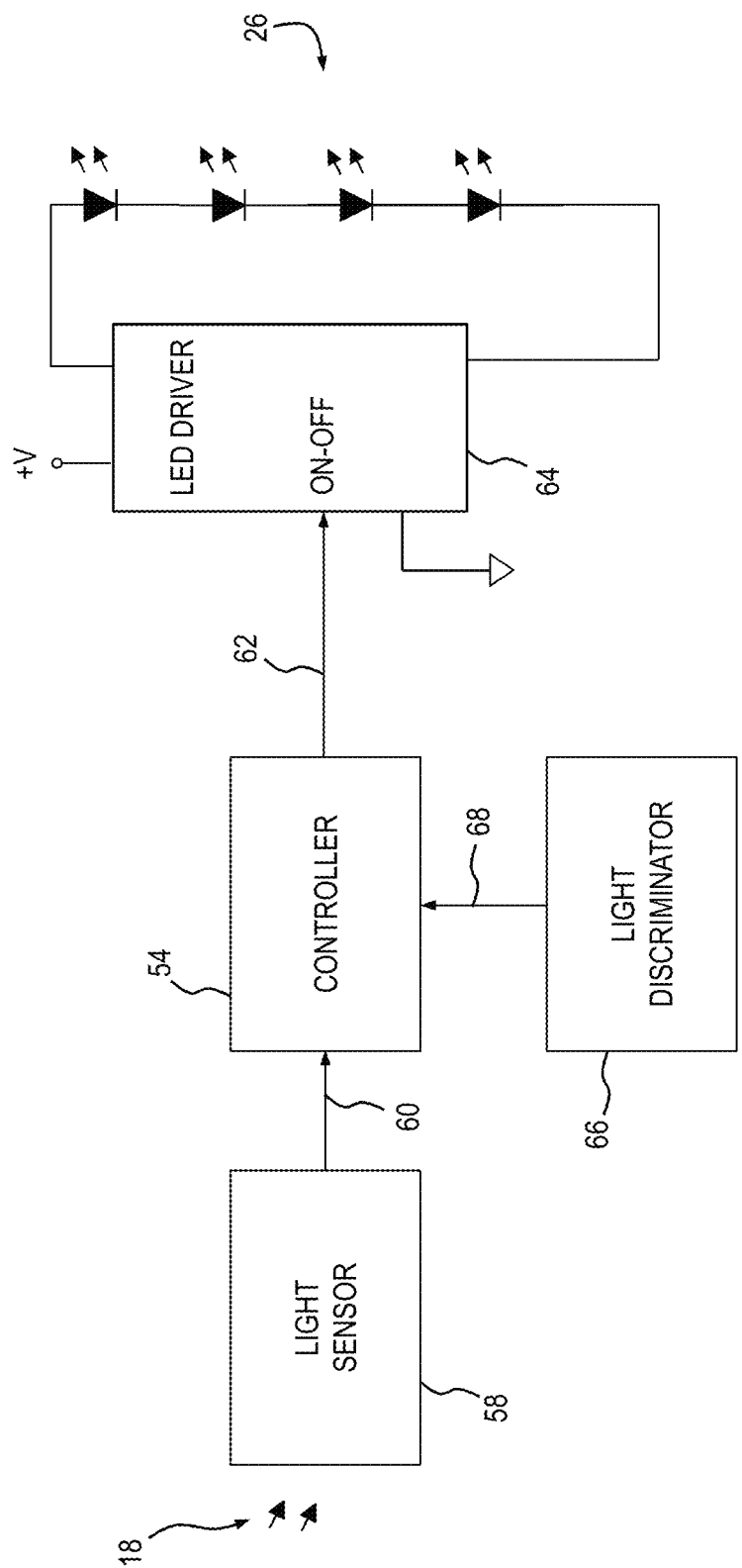
FIG. 8 shows a synchronization control arrangement for the system of FIG. 1.

With reference to FIG. 8, in yet another embodiment a light sensor 58 is coupled to controller 54 and provides an electrical synchronization signal 60 to the controller when the light sensor detects visible light 18 emitted by first light assembly 12. Controller 54 in turn provides an ON-OFF signal 62 to an LED driver power supply 64 to selectably activate IRLEDs 26 of second light assembly 14 synchronously with the visible-light LEDs 20 of first light assembly 12. Preferably, IRLEDs 26 turn on at substantially the same time as visible-light LEDs 20 and also turn off at substantially the same time as visible-light LEDs. In this way, the first and second light assemblies 12, 14 respectively operate in unison to form a single light source that emits both visible and infrared light without the need to provide an electrical synchronization signal to both the first and second light assemblies. In effect, the light output of second light assembly 14 is optically "slaved" to the light output of first light assembly 12.

Light sensor 58 may be any suitable type of light sensor positioned to receive light emitted by visible-light LEDs 20. Examples include, without limitation, variable-resistance photocells such as cadmium sulfide photocells, photo-transistors, and photo-diodes.

A light discriminator 66 may be coupled to controller 54 to evaluate synchronization signal 60 and enable the controller to ignore the synchronization signal. As a non-limiting example, light discriminator 66 may monitor for invalid or unchanging-state synchronization signals 60 and enable controller 54 via a light discriminator signal 68 to ignore the synchronization signal. In one embodiment light discriminator 66 is configured to deter an LED driver 64 from turning on IRLEDs 26 during daylight hours.

Figure 9:
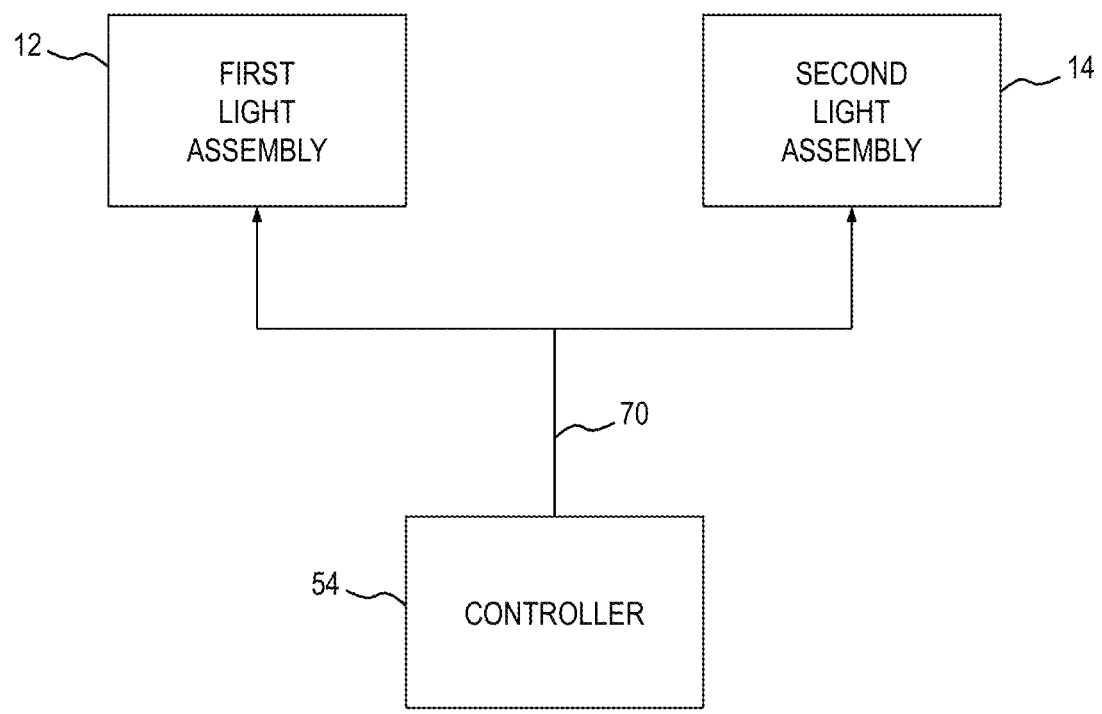
FIG. 9 shows another synchronization control arrangement for the system of FIG. 1.

In still another embodiment, shown in FIG. 9, a first light assembly 12 and a second light assembly 14 are provided an electrical synchronization signal 70 by controller 54. In this arrangement the timing of first light assembly 12 and second light assembly 14 are both slaved to controller 54. Controller 54 may also be configured to control the flashrate and ON-OFF duty cycle of either or both of first light assembly 12 and second light assembly 14.

Figure 10:
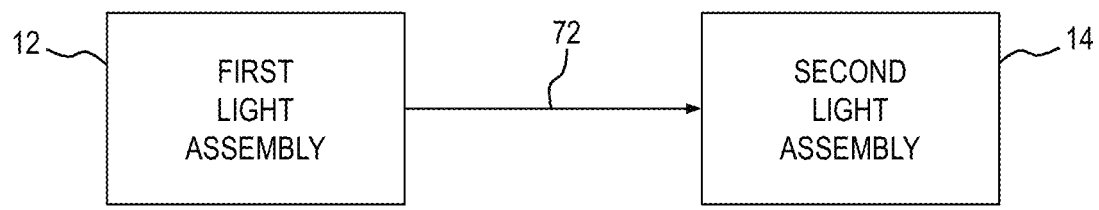
FIG. 10 shows yet another synchronization control arrangement for the system of FIG. 1.

In still another embodiment, shown in FIG. 10, first light assembly 12 provides second light assembly 14 an electrical synchronization signal 72. In this arrangement the flashrate and ON-OFF duty cycle of second light assembly 14 is slaved to that of first light assembly 12. Although not shown in the Figures, it will be appreciated that an arrangement wherein first light assembly 12 is similarly slaved to second light assembly 14 is within the scope of the present disclosure.

Although controller 54 is shown as a separate component in the several Figures, it will be appreciated that the control may be made part of either first light assembly 12 or second light assembly 14. Alternatively, portions of controller 54 may be incorporated into any or all of first light assembly 12, second light assembly 14 and an assembly or assemblies that are separate from the first and second light assemblies. In still other embodiments synchronization signals may be generated by either or both first light assembly 12 and second light assembly 14 and supplied directly to the other without a controller.

While this invention has been shown and described with respect to a detailed embodiment thereof, it will be understood by those skilled in the art that changes in form and detail thereof may be made without departing from the scope of the claims of the invention.

What is claimed is:

1. A lighting system, comprising:
    a first light assembly configured to emit light periodically at a predetermined flashrate;
    a second light assembly spaced apart from the first light assembly, the second light assembly being configured to emit light periodically;
    a light sensor configured to detect light emitted by the first light assembly; and
    a controller coupled to the light sensor,
    the controller controlling the periodic light emissions of the second light assembly such that the light emissions of the second light assembly are slaved to the light emissions of the first light assembly, the light emissions of the second light assembly turning on and off at substantially the same times as the light emissions of the first light assembly, the first and second light assemblies operating in unison to form a single light source.

2. The lighting system of claim 1, further including a mounting bracket having a first and a second, opposing end extending between the first and the second light assemblies.

3. The lighting system of claim 2 wherein:
    the first light assembly further includes a mounting base;
    the first end of the mounting bracket is coupled to the mounting base; and
    the second light assembly is attached to the second end of the mounting bracket.

4. The lighting system of claim 3, further comprising:
    mounting hardware to selectably couple the mounting base to the first end of the mounting bracket; and
    at least one generally "L"-shaped aperture formed in the first end of the mounting bracket, the aperture being configured to receive the mounting hardware without removal of said mounting hardware from the mounting base.

5. The lighting system of claim 2 wherein the mounting bracket comprises:
    a generally planar first member; and
    a generally tubular second member attached to the first member and oriented generally perpendicularly with respect to the first member.

6. The lighting system of claim 5 wherein the second member is adjustably attached to the first member.

7. The lighting system of claim 1 wherein:
    the first light assembly emits visible light; and
    the second light assembly emits infrared light.

8. The lighting system of claim 7, wherein:
    the second light assembly further includes a reflector having a light-reflecting surface; and
    the light-reflecting surface of the reflector is coated with gold.

9. The lighting system of claim 1, further including a light discriminator configured to disable the second light assembly during daylight hours.

10. The lighting system of claim 1 wherein at least one of the first and second light assemblies comprises light emitting diodes.

11. The lighting system of claim 10, further including driver electronics to operate the light emitting diodes, the driver electronics being spaced apart from the light emitting diodes, thereby thermally isolating the driver electronics from the light emitting diodes.

12. The lighting system of claim 1, further including an alarm configured to provide an alerting signal upon detection of a fault in at least one of the first and second light assemblies.

13. The lighting system of claim 12 wherein the second light assembly comprises light emitting diodes, the alarm being configured to detect at least one of an open-circuit and a short-circuit condition in the light emitting diodes.

14. A lighting system, comprising:
    a first light assembly configured to emit light periodically at a predetermined flashrate;
    a second light assembly spaced apart from the first light assembly, the second light assembly being configured to emit light periodically;
    a mounting bracket having a generally planar first member and a generally tubular second member attached to the first member and oriented generally perpendicularly with respect to the first member, the second light assembly being coupled to the second member;
    a light sensor configured to detect light emitted by the first light assembly; and
    a controller coupled to the light sensor,
    the controller controlling the periodic light emissions of the second light assembly such that the light emissions of the second light assembly are slaved to the light emissions of the first light assembly, the light emissions of the second light assembly turning on and off at substantially the same times as the light emissions of the first light assembly, the first and second light assemblies operating in unison to form a single light source.

15. A method for providing lighting, comprising the steps of:
    configuring a first light assembly to emit light periodically at a predetermined flashrate;
    spacing a second light assembly apart from the first light assembly;
    configuring the second light assembly to emit light periodically;
    configuring a light sensor to detect light emitted by the first light assembly; and
    coupling a controller to the light sensor,
    the controller controlling the periodic light emissions of the second light assembly such that the light emissions of the second light assembly are slaved to the light emissions of the first light assembly, the light emissions of the second light assembly turning on and off at substantially the same times as the light emissions of the first light assembly, the first and second light assemblies operating in unison to form a single light source.

* * * * *